United States Patent
Cramby et al.

(10) Patent No.: US 7,020,477 B2
(45) Date of Patent: Mar. 28, 2006

(54) PAGING INCOMMUNICATION SYSTEMS

(75) Inventors: Mathias Cramby, Sollentuna (SE); Johan Magnusson, Stockholm (SE); Gunnar Mildh, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/501,134

(22) PCT Filed: Jan. 13, 2003

(86) PCT No.: PCT/SE03/00034

§ 371 (c)(1),
(2), (4) Date: Feb. 25, 2005

(87) PCT Pub. No.: WO03/058992

PCT Pub. Date: Jul. 17, 2003

(65) Prior Publication Data

US 2005/0148348 A1 Jul. 7, 2005

(30) Foreign Application Priority Data

Jan. 14, 2002 (SE) .................................. 0200106

(51) Int. Cl.
*H04Q 7/20* (2006.01)
(52) U.S. Cl. ................... 455/458; 455/422.1; 455/434; 455/432.1; 455/435.1; 370/328; 370/329
(58) Field of Classification Search ................ 455/458, 455/434, 432.1, 435.1, 422.1; 370/328–329
See application file for complete search history.

(56) References Cited

U.S. PATENT DOCUMENTS

| | | | | |
|---|---|---|---|---|
| 5,278,890 A | * | 1/1994 | Beeson et al. | 340/7.24 |
| 5,373,506 A | * | 12/1994 | Tayloe et al. | 370/311 |
| 5,613,199 A | * | 3/1997 | Yahagi | 455/426.1 |

(Continued)

FOREIGN PATENT DOCUMENTS

| | | |
|---|---|---|
| EP | 1 107 626 A2 | 6/2001 |
| WO | 00/13377 | 3/2000 |

OTHER PUBLICATIONS

International Search Report mailed Apr. 15, 2003 in corresponding PCT application No. PCT/SE03/00034.

*Primary Examiner*—William Trost
*Assistant Examiner*—Sharad Rampuria
(74) *Attorney, Agent, or Firm*—Nixon & Vanderhye, P.C.

(57) ABSTRACT

The present invention refers to methods and systems for enabling paging and DRX in a hybrid cellular communication system comprising a core network (CN) and radio access network (RAN) employing different paging techniques. The core network is associated with a DRX parameter of a CN associated parameter set, which according to the invention, is mapped to a value of a RAN associated parameter set. This resulting value may then be used by the radio access network and/or a mobile station for determining a present paging period of the mobile station. Furthermore, methods of selecting DRX parameters for a mobile station in different operational modes are provided. The invention is particular applicable to a communication system including a GERAN radio access network operating in Iu mode.

61 Claims, 6 Drawing Sheets

U.S. PATENT DOCUMENTS

| | | | |
|---|---|---|---|
| 5,875,400 A * | 2/1999 | Madhavapeddy et al. | 455/458 |
| 5,909,651 A * | 6/1999 | Chander et al. | 455/466 |
| 5,923,649 A * | 7/1999 | Raith | 370/328 |
| 6,058,308 A * | 5/2000 | Kallin et al. | 455/432.3 |
| 6,104,929 A * | 8/2000 | Josse et al. | 455/445 |
| 6,108,542 A * | 8/2000 | Swanchara et al. | 455/434 |
| 6,175,743 B1 * | 1/2001 | Alperovich et al. | 455/466 |
| 6,201,974 B1 * | 3/2001 | Lietsalmi et al. | 455/466 |
| 6,212,390 B1 * | 4/2001 | Rune | 455/456.6 |
| 6,285,667 B1 * | 9/2001 | Willars et al. | 370/329 |
| 6,292,667 B1 * | 9/2001 | Wallentin et al. | 455/458 |
| 6,347,091 B1 * | 2/2002 | Wallentin et al. | 370/437 |
| 6,374,112 B1 * | 4/2002 | Widegren et al. | 455/452.2 |
| 6,377,803 B1 * | 4/2002 | Ruohonen | 455/434 |
| 6,397,065 B1 * | 5/2002 | Huusko et al. | 455/435.2 |
| 6,463,055 B1 * | 10/2002 | Lupien et al. | 370/353 |
| 6,466,790 B1 * | 10/2002 | Haumont et al. | 455/437 |
| 6,522,877 B1 * | 2/2003 | Lietsalmi et al. | 455/422.1 |
| 6,567,667 B1 * | 5/2003 | Gupta et al. | 455/445 |
| 6,594,238 B1 * | 7/2003 | Wallentin et al. | 370/252 |
| 6,628,942 B1 * | 9/2003 | Beming et al. | 455/432.1 |
| 6,628,946 B1 * | 9/2003 | Wiberg et al. | 455/434 |
| 6,650,873 B1 * | 11/2003 | Chen et al. | 455/69 |
| 6,701,149 B1 * | 3/2004 | Sen et al. | 455/436 |
| 6,728,537 B1 * | 4/2004 | Abdesselem et al. | 455/434 |
| 6,745,039 B1 * | 6/2004 | Di Lalla | 455/458 |
| 6,782,274 B1 * | 8/2004 | Park et al. | 455/552.1 |
| 6,792,277 B1 * | 9/2004 | Rajaniemi et al. | 455/456.1 |
| 6,792,278 B1 * | 9/2004 | Ahmavaara et al. | 455/461 |
| 6,807,419 B1 * | 10/2004 | Laiho et al. | 455/436 |
| 6,834,191 B1 * | 12/2004 | Wallentin et al. | 455/442 |
| 6,879,832 B1 * | 4/2005 | Palm et al. | 455/445 |
| 6,889,050 B1 * | 5/2005 | Willars et al. | 455/452.2 |
| 2001/0015963 A1 * | 8/2001 | Tuomainen et al. | 370/311 |
| 2001/0031635 A1 * | 10/2001 | Bharatia | 455/432 |
| 2003/0050097 A1 * | 3/2003 | Amirijoo et al. | 455/560 |
| 2004/0038691 A1 * | 2/2004 | Shin | 455/466 |
| 2004/0082366 A1 * | 4/2004 | Longoni et al. | 455/561 |

* cited by examiner

| DRX PARAMETER IEI | | |
|---|---|---|
| SPLIT_PG_CYCLE CODE | | |
| CN SPECIFIC DRX CYCLE LENGTH COEFFICIENT | SPLIT ON CCCH | NON-DRX TIMER |

PAGING INCOMMUNICATION SYSTEMS

This application is the US national phase of international application PCT/SE03/00034, filed Jan. 13, 2003, which is designated the US and claims priority to SE Application No. 0200106-3 filed Jan. 14, 2002. The entire contents of these applications are incorporated herein by reference.

TECHNICAL FIELD

The present invention generally refers to paging and in particular to discontinuous reception (DRX) in a cellular communication system

BACKGROUND

In a mobile cellular communication system there are no fix access points for a mobile station. Consequently, when the network of the communication system is to contact the mobile station it first has to locate it within the system. In such a case, the network typically sends a paging message intended to the mobile station, which upon reception of the paging call transmits a reply message enabling the network to locate it. A mobile station, thus, has to listen on a particular paging or control channel for any paging messages transmitted from the network. However, continuously monitoring of the paging channel is a very power consuming task, shortening the lifetime of the battery of the mobile station.

In order to save the mobile station's battery, DRX (discontinuous reception) may be introduced in the communication system. DRX makes it possible to divide the common paging channel into several paging groups or sub-channels. A mobile station then only resides and monitors a particular paging sub-channel, known locally both by the mobile station and the network. More importantly, paging messages to a specific mobile station may be scheduled and transmitted at a time derived from information of DRX parameters. Thus, the mobile station knows when relevant paging messages will be sent and can power down for the periods when no paging messages are expected, increasing the lifetime of the battery. In addition, DRX also enables the mobile station to process other tasks during the non-paging periods.

DRX has been employed in communication systems supporting GPRS (General Packet Radio System). A mobile station in RR (Radio Resource) packet idle mode listens to a paging sub-channel on a PCCCH (Packet Common Control CHannel) or a CCCH (Common Control CHannel) at some time instances (paging period) determined by its DRX parameters. These DRX parameters include SPLIT_PG_CYCLE, which firstly indicates whether the mobile station wants to use DRX or not and secondly is used to determine the correct paging period, i.e. the time instances at which paging messages may be expected for the mobile station when camping on PCCCH or, if period split is supported, on CCCH. SPLIT on CCCH indicates whether the mobile station supports the SPLIT_PG_CYCLE option on CCCH, if not supported the corresponding parameter BS_PS_MFRMS is used to determine the correct paging period as for GSM (Global System for Mobile communications). The SPLIT_PG_CYCLE parameter is determined by the mobile station itself among about one hundred different values and is transmitted together with the other DRX parameters to the network in GPRS attach request and routing area update request messages. For a mobile station monitoring a sub-channel of CCCH where SPLIT_PG_CYCLE is not supported or for a mobile station in a GSM network system, the BSS (Base Station Subsystem) broadcasts the corresponding BS_PS_MFRMS parameter. For more information on DRX and paging in GSM and GPRS, reference is made to [1–4]

DRX has also been employed for UTRAN (UMTS Terrestrial Radio Access Network; UMTS (Universal Mobile Telecommunications System)) for mobile stations in RRC (Radio Resource Control) idle mode and some operational states of the RRC connected mode in order to reduce power consumption. For determining its paging occasions, the mobile station calculates a DRX cycle length based on a DRX cycle length coefficient. The mobile station receives information of a CS (Circuit-Switched) CN (Core Network) specific DRX cycle length coefficient in system information from the CS CN domain. A corresponding PS (Packet-Switched) CN specific DRX cycle length coefficient is negotiated between the mobile station and the PS CN domain. Correspondingly, UTRAN may provide a UTRAN DRX cycle length coefficient included in e.g. physical channel reconfiguration and update confirm messages to the mobile station. The mobile station then calculates a UTRAN DRX cycle length and PS and/or CS CN specific DRX cycle lengths based on the provided coefficients and uses the shortest cycle length for determining its paging occasions. For UTRAN there are only four allowed values of the CN specific DRX cycle length coefficients and eight possible UTRAN DRX cycle length coefficients, respectively. More information on paging and DRX in UMTS/UTRAN is provided by [5–7]

For a hybrid cellular communication system consisting of network elements, i.e. core network and radio access network, of two different systems, such as a GSM RAN and a UMTS CN, using different paging principles and techniques, there are problems in obtaining an efficient solution supporting DRX. This is the situation for GERAN (GSM/EDGE Radio Access Network, EDGE (Enhanced Data rates for Global Evolution)) operating in Iu mode, where a proposed solution is that GERAN broadcasts a default SPLIT_PG_CYCLE for use by a mobile station in RRC idle mode. However, this solution results in some major disadvantageous for the mobile station. Firstly, the mobile station will have no possibility of affecting the time length of the paging period and, secondly, it has to support all values of the default SPLIT_PG_CYCLE broadcast by GERAN, which may be as many as for GPRS, i.e. about one hundred:

SUMMARY

The present invention overcomes these and other drawbacks of the prior art arrangements.

It is a general object of the present invention to provide paging and DRX (discontinuous reception) in a hybrid cellular communication system.

It is another object of the invention to provide an efficient paging and DRX solution for hybrid cellular communication systems enabling mobile stations to affect the time length of its paging periods.

Yet another object of the invention is to provide a radio access network operating in a hybrid cellular communication system.

A further object of the invention is to provide a mobile station operating in a hybrid cellular communication system.

These and other objects are met by the invention as defined by the accompanying patent claims.

Briefly, the present invention involves a solution for enabling paging and DRX in a hybrid cellular communication system. Such systems consist of network elements, i.e. a core network and radio access network, which use different paging and DRX principles and techniques. A hybrid cellular communication system may result from the transition between different generations of cellular communication systems, such as from the second generation systems, e.g. GSM/GPRS, (Global System for Mobile communications/ General Packet Radio System), to the third generation systems, e.g. UMTS (Universal Mobile Telecommunications System). A typical hybrid communication system, to which the invention may be applied, is a system comprising a GERAN (GSM/EDGE Radio Access Network, EDGE (Enhanced Data rates for Global Evolution)) radio access network operating in Iu mode, i.e. associated with a UMTS core network.

The invention provides a solution to DRX and paging in the hybrid system by providing a mapping between the different paging principles and methods of selecting DRX parameters for calculating a paging period for a mobile station depending on its operational mode. Generally, the UMTS core network is associated with a CN specific DRX cycle length coefficient of a core network associated parameter set, which it uses to determine a paging period. However, the radio access network and the mobile station determines paging periods based on a different DRX parameter, a SPLIT_PG_CYCLE of a radio access network associated parameter set. The mapping of the invention uses a function for mapping a CN specific DRX cycle length coefficient to a SPLIT_PG_CYCLE value. The mapping function follows:

$$\text{SPLIT\_PG\_CYCLE}=3\times 2^{9-CN \text{ specific DRX cycle length coefficient}}.$$

This mapping is preferably such that the period between pages of the mobile station is similar, and more preferably the same, for corresponding values of CN specific DRX cycle length coefficient and SPLIT_PG_CYCLE. In other words, a paging period calculated by the core network based on its CN specific DRX cycle length coefficient is preferably equal in length as a paging period calculated by the radio access network and/or mobile station based on a corresponding value of SPLIT_PG_CYCLE. Furthermore, the mapping preferably satisfies the periodicity requirement. This periodicity requirement means that a paging period is an integer number division of longer periods, or stated in other words, a paging period is a multiple of shorter paging periods.

The UMTS core network basically comprises a CS (Circuit-Switched) core network domain, including a 3G-MSC (Mobile Switching Center), and a PS (Packet-Switched) core network domain, including a 3G-SGSN (Serving GPRS Support Node). The CS core network domain is associated with a CS DRX parameter, either a CS CN specific DRX cycle length coefficient or a CS SPLIT_PG_CYCLE. This CS DRX parameter is provided to the radio access network, where it is broadcast on a broadcast control channel, e.g. PBCCH (Packet Broadcast Control CHannel). Once received by a mobile station this DRX parameter is checked in order to investigate to which parameter set it belongs. If of the core network parameter set, the mobile station uses the mapping function to map it to a corresponding value of the radio access network domain. This parameter mapping may, alternatively, be provided by the radio access network, which then will broadcast the resulting mapped value.

Correspondingly, the PS core network domain is associated with a PS CN specific DRX parameter of the core network parameter set. This PS DRX parameter is preferably negotiated between the mobile station and the PS domain of the core network, e.g. during NAS (Non-Access Stratum) procedures. Such a negotiation allows the mobile station to affect the value of the PS DRX parameter, and consequently the length of a paging period determined by such a negotiated parameter. If no PS DRX parameter is determined in the negotiation procedure or if no negotiation is performed, a default PS CN specific DRX parameter may be broadcast, e.g. on PBCCH, set in standard and/or stored in an identity module associated with the mobile station.

Once these (CS and/or PS) CN DRX parameters are provided to the mobile station it stores them for later use in determining its paging period.

A mobile station in RRC (Radio Resource Control) idle mode performs a selection method for determining which DRX parameter to use for calculation of the paging period. If the mobile station is attached to the CS core network domain, it uses the CS SPLIT_PG_CYCLE for determining its paging period. This CS SPLIT_PG_CYCLE is provided as broadcast information, or its corresponding CS CN specific DRX cycle length coefficient is broadcast, in which case the mobile station maps it to get CS SPLIT_PG_CYCLE. A mobile station attached to the PS core network domain maps the PS CN specific DRX cycle length coefficient to a PS SPLIT_PG_CYCLE, if not already provided as a PS DRX parameter of the radio access network set, and determines the paging period based on PS SPLIT_PG_CYCLE. However, a mobile station attached to both the CS and PS core network domain first compares the CS DRX parameter and the PS DRX parameter and selects the parameter that results in the shortest paging period. The present paging period is then determined based on the selected DRX parameter.

The radio access network is correspondingly associated with a DRX parameter, RAN SPLIT_PG_CYCLE, of the radio access network associated parameter set. This RAN SPLIT_PG_CYCLE may be negotiated between the radio access network and the mobile station, allowing the mobile station to affects its value. Alternatively, the RAN DRX parameter may be broadcast or provided to the mobile station in different messages sent from the radio access network.

A corresponding DRX parameter selection method as for RRC idle mode is provided for a mobile station in RRC connected mode. In this operational mode the mobile station compares the RAN DRX parameter with one of DRX parameters discussed above. For example, a mobile station in RRC idle mode attached to the CS core network domain, compares RAN SPLIT_PG_CYCLE with the CS SPLIT_PG_CYCLE. If instead attached to the PS core network domain, the mobile station compares RAN SPLIT_PG_CYCLE with the mapped version (PS SPLIT_PG_CYCLE) of the PS DRX parameter associated with the PS domain of the core network. Similarly, if attached to both CS and PS domain, the comparison is performed on CS, PS and RAN SPLIT_PG_CYCLE. The mobile station then selects the DRX parameter that results in the shortest paging period, i.e. max[SPLIT_PG_CYCLE], for usage in determining the paging time instances.

A similar method of determining a paging period of a mobile station is provided for the radio access network. In an embodiment of the invention, the radio access network uses a DRX parameter provided in the paging request message transmitted from the core network or its mapped SPLIT_PG_CYCLE counterpart, if the DRX parameter is of the core network associated parameter set. In another embodiment, if the mobile station is in RRC idle mode, the radio access network compares the broadcast DRX parameter associated with core network domain(s), to which the mobile station is attached, and any DRX parameter included in the paging request message transmitted from the core network domain, which wants to contact/locate the mobile station. However, if the mobile station is in RRC connected mode, also the RAN DRX parameter is included in the comparison in addition to the broadcast and message included DRX parameters. The radio access network then selects and determines the paging period and paging time instances of the mobile station based on the DRX parameter that results in the shortest paging period. In a further embodiment of the invention, the radio access network selects the DRX parameter that results in the longest paging period.

The mobile station preferably includes the PS CN specific DRX cycle length coefficient in GPRS attach request and/or routing area update messages sent to the 3G-SGSN of the PS core network domain. Once, provided to the PS core network domain, the 3G-SGSN will eventually include this PS CN specific DRX cycle length coefficient in paging request messages transmitted to radio access network (which will map the parameter to PS SPLIT_PG_CYCLE for determining the paging period).

The mobile station preferably also provides the PS core network domain with the "legacy GPRS DRX parameters". These parameters were discussed in the background section and include SPLIT on CCCH, non-DRX timer and the GPRS SPLIT_PG_CYCLE. These legacy parameters will no be used as long as the mobile station stays within cells supporting GERAN Iu mode, but can be used if the mobile station moves to a cell with only A/Gb mode support, i.e. a cell associated with a second generation GSM/GPRS core network, including a 2G-MSC and 2G-SGSN. If these legacy GPRS parameters are provided to the 3G-SGSN, they will be sent to the 2G-SGSN upon cell change.

The mobile station may also include the PS DRX cycle length coefficient in routing area update message when it moves from a cell supporting only A/Gb mode to a UTRAN cell. Similarly the DRX cycle length coefficient may be attached to routing area update messages when moving from an A/Gb supporting cell to a cell supporting a GERAN Iu mode. This is because a later movement to a UTRAN cell from the GERAN Iu mode operating cell will not necessarily result in a change of routing area, and consequently no routing area update message is sent. However, if the mobile station moves from a UTRAN cell to a cell supporting GERAN Iu mode, no new transfer of DRX parameters over the radio interface is required. The 3G-SGSN will use the PS CN specific DRX cycle length coefficient and GERAN and/or the mobile station will map it to a PS SPLIT_PG_CYCLE value.

The invention offers the following advantages:
Provides an efficient solution for enabling paging and DRX in a hybrid cellular communication system comprising core network and radio access network employing different paging and DRX techniques;
Provides the possibility of a mobile station to affect and control the time length of its paging period;
Enables a mobile station to select a large paging period, and consequently save battery, during period with low expected paging requests;
Radio access network application part will not be impacted; and
The mobile station is not required to support a large range of different DRX parameters as for GPRS/GSM.

SHORT DESCRIPTION OF THE DRAWINGS

The invention together with further objects and advantages thereof, may best be understood by making reference to the following description taken together with the accompanying drawings, in which.

DETAILED DESCRIPTION

Throughout the drawings, the same reference characters will be used for corresponding or similar elements.

Figure 1:
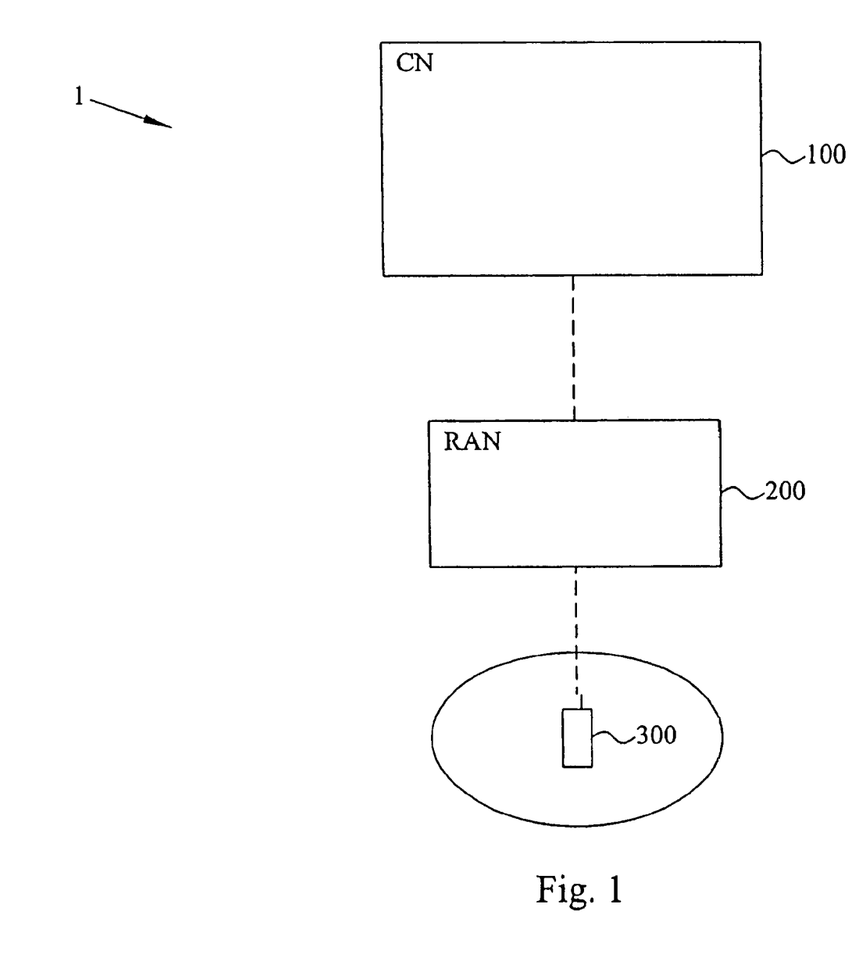
FIG. 1 is a schematic overview of a portion of a hybrid cellular communication system.

The present invention is generally applicable to a hybrid cellular communication system, schematically illustrated in FIG. 1. The expression "hybrid cellular communication system", as used herein, refers to a cellular communication system 1 consisting of network elements, i.e. a core network 100 and radio access network 200, using different paging and DRX (discontinuous reception) principles and techniques. The invention provides an elegant solution for enabling determination of the paging period of a mobile station 300 attached to such a system 1. In addition, the invention allows the mobile station 300 to affect the time length of its associated paging period, thereby providing an efficient and power saving implementation of DRX in the hybrid system 1. Furthermore, the invention provides methods of selecting DRX parameters based on the operational mode of the mobile station 300.

A hybrid cellular communication system may be a result of the transition between different generations of cellular communication systems, such as from the second generation systems, e.g. GSM/GPRS, (Global System for Mobile communications/General Packet Radio System), to the third generation systems, e.g. UMTS (Universal Mobile Telecommunications System). In the following the invention will be discussed with reference to an illustrating example of a such hybrid cellular communication system embodied by a system comprising a GERAN (GSM/EDGE Radio Access Network, EDGE (Enhanced Data rates for Global Evolution)) radio access network operating in Iu mode. GERAN provides a step from the second generation system to the future third generation systems, as exemplified by UMTS and its associated UTRAN (UMTS Terrestrial Radio Access Network) radio access network, by employing high-speed transmission techniques and combining it with a GPRS radio link interface. Furthermore, GERAN provides efficient support for all QoS service classes defined for UMTS, including real-time and IP multimedia services. By adopting the Iu operation mode GERAN has the ability to interface with the third generation UMTS core network. Additional information of GERAN is provided by [8]. Although the present invention will be discussed with reference to a particular example, it is, however, not limited to thereto but also embraces other hybrid cellular communication systems.

Figure 2:
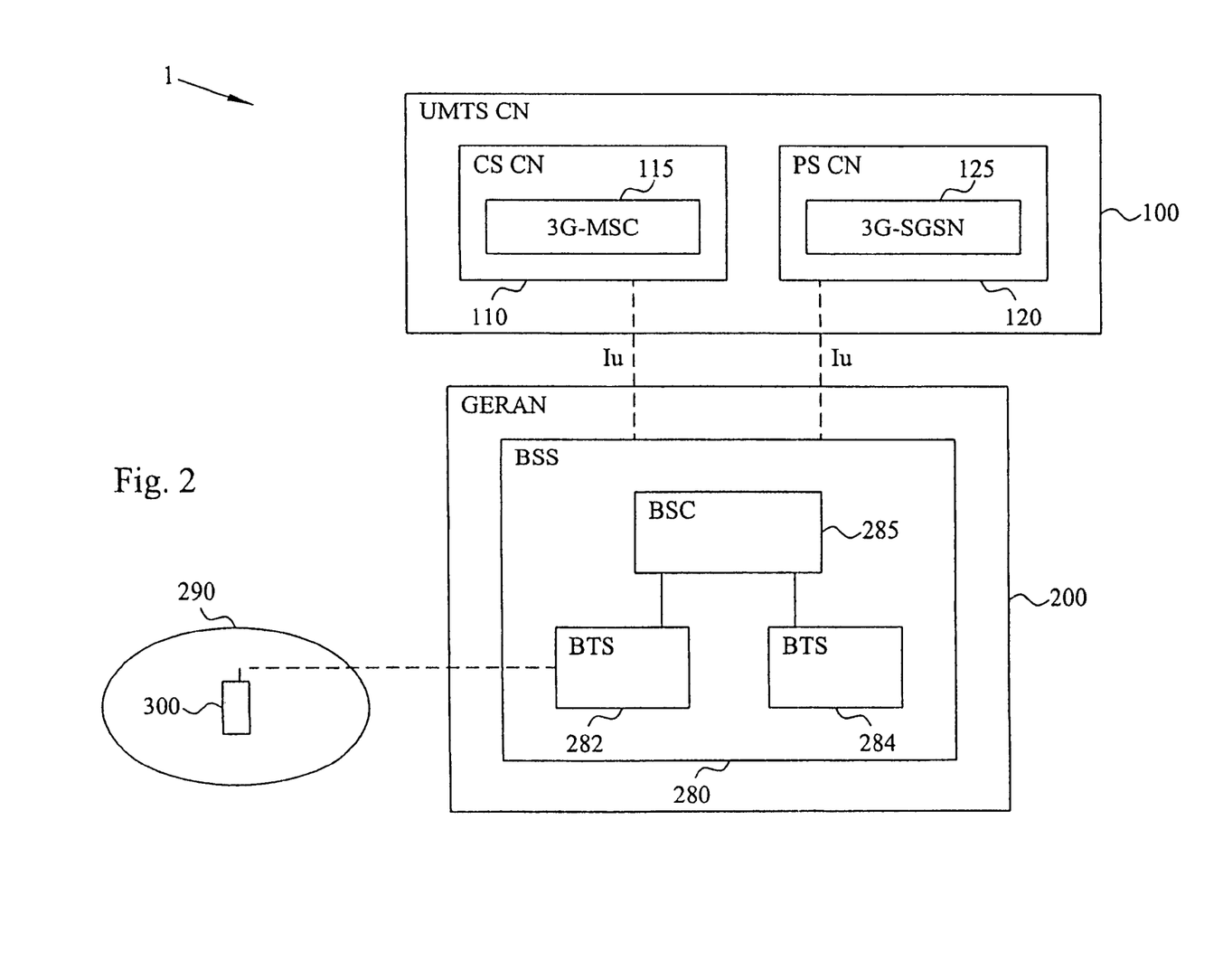
FIG. 2 is a schematic illustration of a hybrid cellular communication system with a GERAN radio access network operating in Iu mode.

FIG. 2 is a schematic overview of a hybrid system 1 employing a GERAN radio access network 200 operating in Iu mode. The system includes a UMTS core network 100, in turn basically comprising a CS (Circuit-Switched) core network domain 110 and a PS (Packet-Switched) core network domain 120. The CS core network domain 110 provides circuit-switched services through the Iu interface between its associated third generation MSC (Mobile Switching Center) 115 and GERAN 200. The PS core network domain 120 is correspondingly arranged to provide packet-based (real-time) services from its third generation SGSN (Serving GPRS Support Node) 125.

The GERAN radio access network 200 has similar overall design as a GSM radio access network. GERAN includes a number of BSSs (Base Station Subsystems) 280, of which one is illustrated in FIG. 2. The BSS 280 comprises a BSC (Base Station Controller) 285 controlling one or several BTS (Base Transceiver System), such as BTS 282 and BTS 284. Each BTS includes a base station (not illustrated) conducting communication with a number of mobile stations 300 within a cell 290, covering a certain geographical area.

For enabling support of DRX and determination of a paging period for the mobile station 300 in the hybrid system 1, DRX parameters are required. The UMTS core network 100 uses a CN specific DRX cycle length coefficient for calculating a CN specific DRX cycle length according to:

$$\text{CN specific DRX cycle length} = \max[2^k, \text{PBP}] \text{ frames}, \quad (1)$$

where k is the DRX cycle length coefficient and PBP is the paging block periodicity. PBP is only applicable for TDD (Time Division Duplex) and is equal to the PICH (PIlot CHannel) repetition period, which is broadcast in system information. For FDD (Frequency Division Duplex) PBP is equal to 1. Each frame corresponds to 10 ms, whereby the CN specific DRX cycle length in equation (1) allows the UMTS core network 100 to determine the paging period associated with a mobile station 300, which is attached to the core network 100. This paging period basically specifies the time interval between time instances when a paging request message may be transmitted to the mobile station 300.

GERAN 200 uses, correspondingly, a DRX parameter, SPLIT_PG_CYCLE, in order to calculate the period between pages:

$$\text{Paging period} = \frac{64 \cdot 52 - \text{multi frames}}{\text{SPLIT\_PG\_CYCLE}} \approx \frac{15.36}{\text{SPLIT\_PG\_CYCLE}} \text{s}. \quad (2)$$

The general idea of the invention is to provide an alignment between the two different principles for paging and DRX of the core network 100 and the radio access network 200 by providing a technique for mapping between the UMTS CN specific DRX cycle length coefficient and SPLIT_PG_CYCLE. Thus the invention maps DRX parameters of a core network associated parameter set (CN specific DRX cycle length coefficient) to corresponding DRX parameters of a radio access network associated parameter set (SPLIT_PG_CYCLE). This mapping is preferably such that the period between pages to the mobile station 300 is similar, and more preferably the same, for corresponding values on CN specific DRX cycle length coefficient and SPLIT_PG_CYCLE. In other words, a paging period calculated by the core network 100 based on its CN specific DRX cycle length coefficient is preferably equal in length to a paging period calculated by the radio access network 200 and/or mobile station 300 based on a corresponding value of SPLIT_PG_CYCLE. Furthermore, the mapping preferably satisfies the periodicity requirement. This periodicity requirement means that a paging period is an integer number division of longer periods, or stated in other words, a paging period is a multiple of shorter paging periods.

Figure 3:
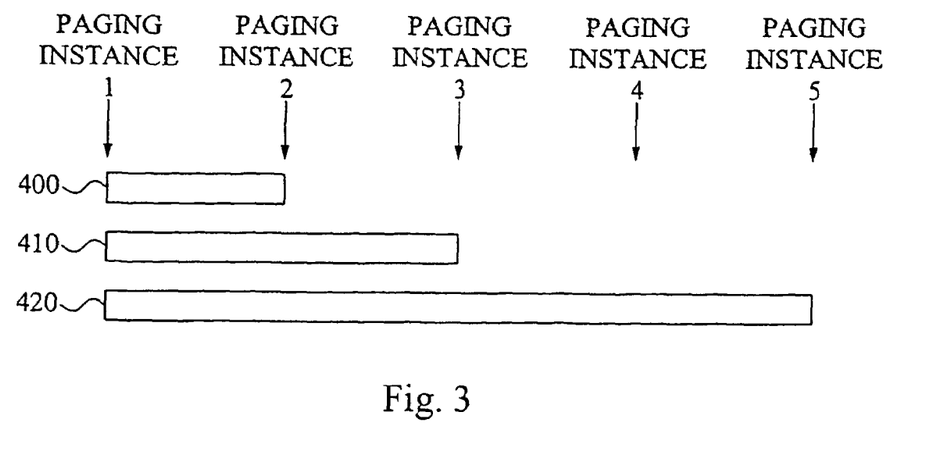
FIG. 3 is an illustration depicting different paging periods satisfying the periodicity requirement.

FIG. 3 schematically illustrates three paging periods 400, 410, 420 satisfying this requirement. The paging period 410 is two times as long as the shortest paging period 400. Similarly, the longest paging period 420 is two times as long as the paging period 410 and four times as long as the paging period 400. Thus, a mobile station employing the paging period 400 may receive a paging message at the time instances 1, 2, 3, 4 and 5. However, if the paging period 410 is used, paging messages may only be transmitted/received at the time instances 1, 3 and 5. The corresponding allowed time instances for the longest paging periods 420 is 1 and 5. Thus, a mobile station using the shortest paging period 400, also may receive paging messages transmitted at paging instances (1, 3 and 5, and 1 and 5, respectively) of longer paging periods, i.e. paging period 410 and 420. Similarly, if the mobile station is associated with the paging period 410, it also may receive paging messages transmitted at paging instances (1 and 5) associated with the paging period 420.

The mapping between the core network associated DRX parameters and the radio access network associated parameters preferably follows equation (3) below:

$$\text{SPLIT\_PG\_CYCLE} = 3 \times 2^{9-\text{CN specific DRX cycle length coefficient}}. \quad (3)$$

Examples of preferred values of the SPLIT_PG_CYCLE and CN specific DRX cycle length coefficient with paging periods determined based on the parameters are found in Table 1.

TABLE 1

| DRX cycle length coefficient | DRX cycle length | Period (s) | SPLIT_PG_CYCLE | Period (s) |
|---|---|---|---|---|
| 3 | 8 | 0.08 | 192 | 0.08 |
| 4 | 16 | 0.16 | 96 | 0.16 |
| 5 | 32 | 0.32 | 48 | 0.32 |
| 6 | 64 | 0.64 | 24 | 0.64 |
| 7 | 128 | 1.28 | 12 | 1.28 |
| 8 | 256 | 2.56 | 6 | 2.56 |
| 9 | 512 | 5.12 | 3 | 5.12 |

The values 6 to 9 of the DRX cycle length coefficient in Table 5 corresponds to the four allowed values of the CN specific DRX cycle length coefficients used in a UMTS/UTRAN communication system, which is mentioned in the background section.

During operation the mobile station may be attached to the CS and/or PS core network domain, and consequently each is associated with a respective DRX parameter for determining a paging period of the mobile station.

The CS core network domain may be associated with a CS SPLIT_PG_CYCLE. This DRX parameter may be used directly by the radio access network (GERAN) and/or the mobile station for determining the relevant paging period without any mapping. CS SPLIT_PG_CYCLE is preferably broadcast on a channel, e.g. a control channel, such as PBCCH (Packet Broadcast Control CHannel). Such broadcast control channel is employed by the system for conveying system information to the mobile station. This CS SPLIT_PG_CYCLE broadcasting may be provided by GERAN (one or several BTS of GERAN) through an operation and maintenance system adapted for managing broadcast information and conveying the information from the core network to the radio access network. In addition, the CS DRX parameter (CS SPLIT_PG_CYCLE) is preferably included in paging request messages transmitted from the CS core network domain to GERAN. Preferred values of the CS SPLIT_PG_CYCLE are those listed in Table 1 above, of which the values 3, 6, 12 and 24 are particularly preferred. A mobile station listening on PBCCH retrieves the CS SPLIT_PG_CYCLE and uses it to calculate a paging period, which is discussed in more detail below. The mobile station preferably also stores this broadcast CS associated DRX parameter.

In another embodiment of the present invention, the CS domain of the core network is associated with a CS CN specific DRX cycle length coefficient. This DRX parameter can not be used directly by the radio access network, i.e. GERAN, or the mobile station for determining a paging period but should first be mapped to a corresponding CS SPLIT_PG_CYCLE value. The mapping may be performed by GERAN, which receives the CS CN specific DRX cycle length coefficient from the CS core network domain and calculates the CS SPLIT_PG_CYCLE. Then this calculated CS DRX parameter of the radio access network associated parameter set may be broadcast e.g. by GERAN on PBCCH, similar to above.

Alternatively, the CS CN specific DRX cycle length coefficient may be broadcast (e.g. on PBCCH). In such a case, the mobile station will, once received, map this value to a corresponding CS SPLIT_PG_CYCLE for enabling calculation of the paging period. As is mentioned above, the mobile station may also store the CS CN specific DRX cycle length coefficient or its mapped counterpart. The CS domain of the core network preferably includes the CS CN specific DRX cycle length coefficient in paging request messages transmitted to GERAN.

The PS core network domain is also associated with a DRX parameter, a PS CN specific DRX cycle length coefficient. This DRX parameter is preferably negotiated between the PS core network domain and the mobile station. This negotiation may be performed as a part of the NAS (Non-Access Stratum) procedure. In Iu mode, NAS and NAS procedures refer to information and/or messages transmitted directly between the mobile station and the core network. The radio access network is not required to, or is denied, access to such NAS messages. The negotiated value is preferably stored in the mobile station.

The negotiation between the mobile station and the PS domain of the core network allows the mobile station to, at least partly, attect and decide the value of the PS DRX parameter and consequently, the length of the paging period. This is a major advantage, since the mobile station may then negotiate and use long periods between pages ("sleeping time") in order to save battery during periods of expected low paging calling.

If no negotiation is performed or no PS CN specific DRX cycle length coefficient is determined in the negotiation, a default PS CN specific DRX cycle length coefficient may be employed for DRX purposes. This default parameter may be broadcast, e.g. on PBCCH, similar to the DRX parameter associated with the CS core network domain. The mobile station then maps the DRX parameter to a corresponding value of the radio access network associated parameter set. The PS CN specific DRX cycle length coefficient may also be provided to the GERAN, which then maps it to a corresponding PS SPLIT_PG_CYCLE, which is then broadcast. Once received by the mobile station, the broadcast DRX parameter is preferably stored. Alternatively, or in addition, the default PS CN specific DRX cycle length coefficient, or its mapped counterpart, may be set in standard and/or stored on an identity module associated with the mobile station, e.g. the network SIM (Subscriber Identity Module) used in GSM mobile stations. Preferred values of the PS CN specific DRX cycle length coefficient, including the default value, are those listed in Table 1. Particularly preferred values are those PS CN specific cycle length coefficients, which, once mapped, correspond to PS SPLIT_PG_CYCLE values of 3, 6, 12 and 24.

Also the radio access network, e.g. GERAN, of the hybrid communication system may be associated with a DRX parameter for use in calculating a paging period of a mobile station. This parameter is GERAN SPLIT_PG_CYCLE, which is of the radio access network associated parameter set. The parameter may be broadcast on a control channel, e.g. PBCCH, and/or included in RRC (Radio Resource Control) messages transmitted to the mobile station, including, but not limited to, cell update confirm, GRA (GERAN Registration Area) update confirm, radio bearer reconfiguration, radio bearer release, radio bearer setup and RRC connection setup messages. Alternatively, or in addition, the GERAN SPLIT_PG_CYCLE may be negotiated between GERAN and the mobile station. Such a negotiation may be part of the RCC connection setup. Once a GERAN SPLIT_PG_CYCLE is provided to the mobile station, whether negotiated, received in a message or on broadcast channel, it may be stored. Preferred values of GERAN SPLIT_PG_CYCLE are those listed in Table 1, i.e. 3, 6, 12, 24, 48, 96 and 192.

The operation of a mobile station according to the present invention will now be discussed, and in particular a method employed by the mobile station for selecting DRX parameter for determining a paging period.

Starting with operation of a mobile station in RRC idle mode. When a mobile station is switched on, it attempts to make contact with the core network of the hybrid communication system. The mobile station looks for a suitable cell of the chosen core network and chooses that cell to provide available services, and tunes to its control channel. The mobile station will then register its presence in the registration area of the chosen cell, e.g. by means of location registration, GPRS attach or IMSI (International Mobile Subscriber Identity) attach procedure. Thus, in this mode, the mobile station is attached to the core network and is known on a LA (Location Area) or RA (Routing Area) level by the network. If the core network wants to contact the mobile station, e.g. due to a call for the mobile station, the core network sends a paging message for the mobile station on the paging sub-channel derived from DRX information associated with the mobile station at a time instance defined by the paging period of the mobile station.

Figure 4:
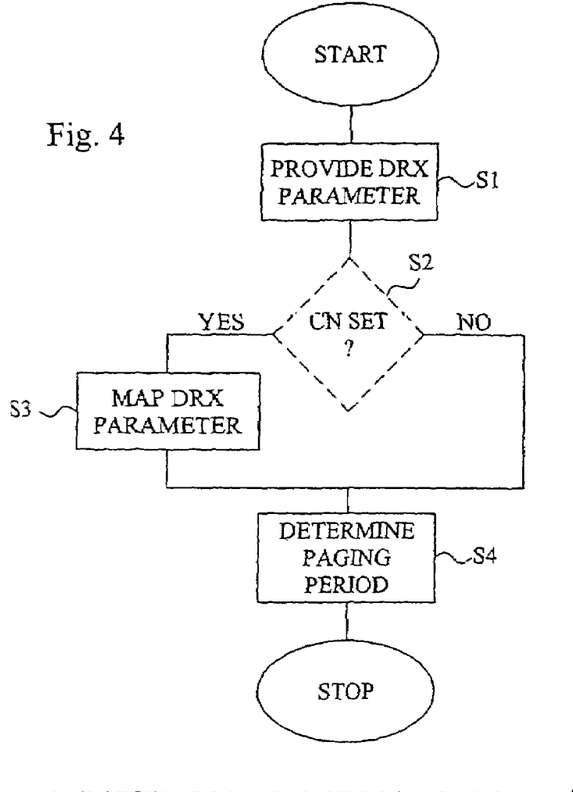
FIG. 4 is a flow chart illustrating an embodiment of a method of determining a paging period for a mobile station according to the present invention.

The mobile station may be attached to the CS and/or PS domain of the core network. FIG. 4 illustrates the method of selecting DRX parameter and determining paging period based on the selected parameter for a mobile station in RRC idle mode connected to the CS or PS core network domain. The method starts by providing the relevant DRX parameter in step S1. For CS core network attached mobile stations, the relevant DRX parameter is CS CN specific DRX cycle length coefficient or its mapped counterpart, CS SPLIT_PG_CYCLE. The CS DRX parameter may be stored in the mobile station and is then retrieved from the memory location. Alternatively, the parameter may be broadcast to the mobile station. The corresponding DRX parameter, when attached to the PS core network domain is the PS CN specific cycle length coefficient (PS SPLIT_PG_CYCLE). This PS DRX parameter may be retrieved from a memory location, retrieved from storage on SIM, provided during negotiation procedures, set in standard and/or received in broadcast information.

Then, the mobile station may optionally check if the DRX parameter is of the core network associated or the radio access network associated parameter set in step S2. However, this step may be omitted if it is standardized in which parameter set the PS and CS DRX parameters is provided to the mobile station. For example, the GERAN may be implemented to broadcast CS SPLIT_PG_CYCLE, i.e. of the radio access network associated parameter set, whereas PS CN specific DRX cycle length coefficient, i.e. of the core network associated parameter set, is negotiated between the PS core network domain and the mobile station and/or provided by some or all of the above-identified procedures. In such a case, the mobile station knows in advance to which parameter set the provided DRX parameter belongs and no check is required.

If the provided parameter belongs to the core network parameter set as confirmed by the checking step S2 or known in advance, it is mapped by the mobile station in step S3 to its counterpart of the radio access network associated parameter set (CS SPLIT_PG_CYCLE or PS SPLIT_PG_CYCLE). The mobile station then determines its paging period based on the (mapped) DRX parameter in step S4.

Figure 5:
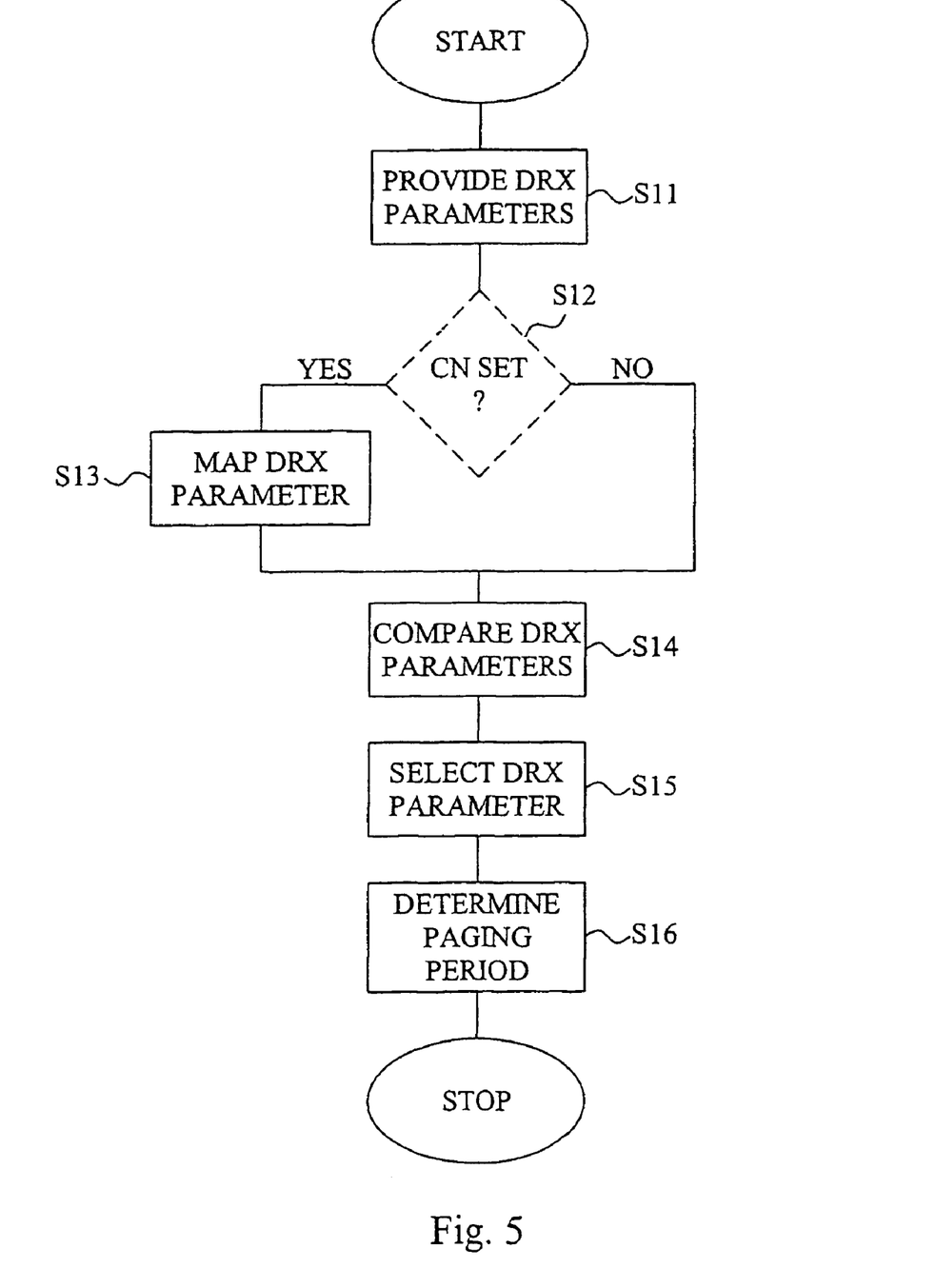
FIG. 5 is a flow chart illustrating another embodiment of a method of determining a paging period for a mobile station according to the present invention.

The corresponding method of a mobile station in idle mode attached to the CS and PS or a mobile station in RRC connected mode is illustrated in FIG. 5. In RRC connected mode, the mobile station is attached, on one hand, to the core network, CS and/or PS domain, and on the other, to a BSS of the GERAN. The mobile station is then known by the network on cell or GRA (GERAN Registration Area) level.

The method starts by the mobile station providing the DRX parameters in step S11. The relevant parameters include the CS and PS DRX parameter for the mobile station in idle mode, whereas a mobile station in connected mode provides the GERAN DRX parameter (GERAN SPLIT_PG_CYCLE) and the CS, PS or CS and PS DRX parameter, depending on whether the mobile station is attached to the CS, PS or CS and PS core network domain, respectively. Provision of CS and PS DRX parameters (CS/PS CN specific DRX cycle length coefficient or CS/PS SPLIT_PG_CYCLE) is similar to step S1 in FIG. 4. The GERAN DRX parameter may be provided from a memory location in the mobile station, received in a message or on broadcast channel or through negotiation.

In the optional step S12 the mobile station checks if the DRX parameters is of the core network associated parameter set. As was mentioned in connection to step S2 in FIG. 4, this step may be omitted if the mobile station in advance knows to which parameter set the relevant DRX parameters belong. Any parameters of the core network associated parameter set are mapped according to the invention to a corresponding SPLIT_PG_CYCLE value in step S13.

In step S14, the mobile station compares the relevant DRX parameters, i.e. CS and PS SPLIT_PG_CYCLE in RRC idle mode attached to both the CS and PS domain and GERAN and CS and/or PS SPLIT_PG_CYCLE in RRC connected mode. The mobile station then selects the DRX parameter that results in a shortest paging period, i.e. max[SPLIT_PG_CYCLE], in step S15. Finally, the mobile station determines its paging period based on the selected DRX parameter in step S16.

The mobile station then listens to any paging requests on its paging sub-channel on a PCCCH (Packet Common Control CHannel) or CCCH (Common Control CHannel) at the time instances given by the determined paging period.

In an embodiment of a corresponding method of the radio access network (GERAN) for determining the paging period of a mobile station, the radio access network receives the DRX parameter in a paging request message from the core network. The radio access network then uses this received DRX parameter, or its mapped counterpart, if provided in the core network associated paramter set, for determining the paging period and paging instances employed for transmitting a paging message to the mobile station.

Alternatively, the radio access network may use a method for determining the paging period of a mobile station, which is similar to the method for the mobile station discussed above with reference to FIG. 5. GERAN provides (step S11) the DRX parameters from the information broadcast on the relevant control channel. In addition, DRX parameters may be included in the paging request message from the core network domain that wants to locate and contact the mobile station, through transmission a paging message. The GERAN may then, optionally, check (step S12) if any of the DRX parameters is of the core network associated parameter set. This step could be omitted if it is standardized, to which parameter set the broadcast parameters and the parameters in paging messages belong. The GERAN then maps (step S13), if required, any provided DRX parameters to their corresponding values of the radio access network associated parameter set, e.g. by using equation (3) above. A comparison (step S14) is then performed and the radio access network selects (step S15) the DRX parameter which results in the shortest paging period, i.e. max[SPLIT_PG_CYCLE]. Finally, GERAN determines (step S16) the paging period for the mobile station based on the selected DRX parameter.

In a further embodiment the step S11 to S14 is similar to above. However, GERAN selects (step 15) the DRX paramter that results in the longest paging period, i.e. min[SPLIT_PG_CYCLE]. GERAN then determines (S16) the paging period to use for transmitting a paging message to the mobile station based on the selected DRX paramter. This embodiment of method and also the embodiment where GERAN always uses the DRX paramter received in paging request messages may be particular advantageous in some applications. This may be the situation when the mobile station has chosen a longer paging period than a paging period associated with a broadcast DRX parameter, thereby saving its battery power.

GERAN, then, may transmit any paging messages to the mobile station on its associated paging sub-channel on a PCCCH (Packet Common Control CHannel) or CCCH (Common Control CHannel) at time instances derived from the determined paging period.

Figure 6:
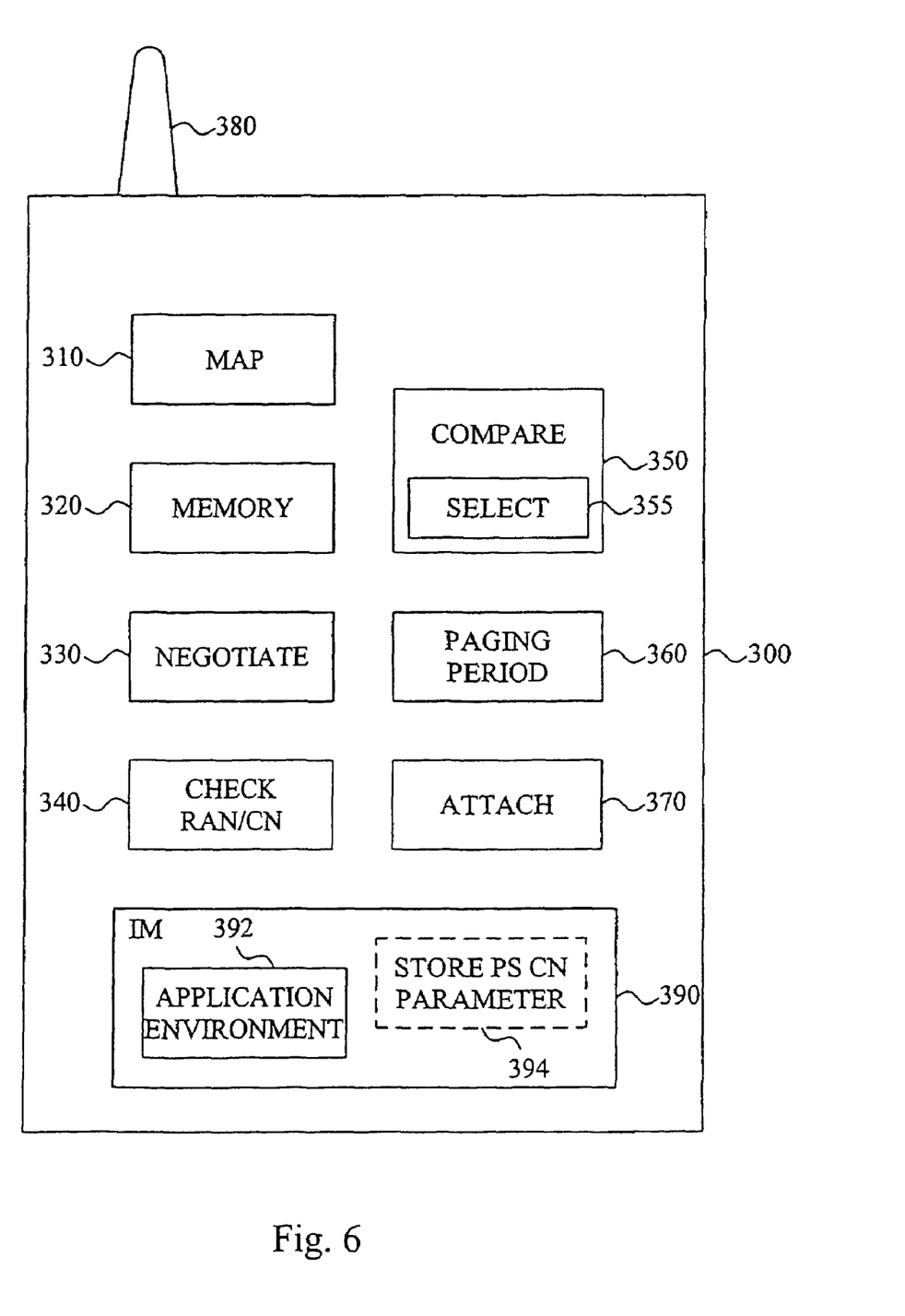
FIG. 6 is a schematic block diagram illustrating a mobile station adapted for employing the present invention.

A block diagram of mobile station embodying the present invention is illustrated in FIG. 6. In FIG. 6, only elements relevant for the teaching of the present invention are depicted in the block diagram. Generally, the mobile station 300 preferably comprises means 310 implemented to map DRX parameters of the core network associated parameter set (CN specific DRX cycle length coefficient) to a corresponding value of the radio access network associated parameter set (SPLIT_PG_CYCLE). Of course, the mapping means 310 may also be configured to map a SPLIT_PG_CYCLE to CN specific DRX cycle length coefficient, basically by using the inverse function of equation (3). Alternatively, or in addition, the radio access network (GERAN) may be implemented with a mapping means, whereby GERAN provides the mobile station 300 with any required mapping functionality, by transmitting the mapped values to the mobile station 300. However, since GERAN may not be directly involved in parameter provision, e.g. during negotiation between the mobile station 300 and the PS core network domain, the mapping means 310 is preferably provided in the mobile station 300.

Furthermore, memory 320 is preferably arranged in the mobile station 300 for allowing storage of the different DRX parameters associated with the core network domains and/or radio access network, to which the mobile station 300 is attached. Since the mobile station 300 may be attached to several core network domains, it preferably stores DRX parameters associated with each domain in the memory 320.

A negotiation means 330 may be implemented to provide the mobile station 300 with functionality to decide DRX parameters through a negotiation with the PS core network domain, e.g. during NAS procedures, and/or with GERAN. Any negotiated DRX parameter is then preferably stored in the provided memory 320.

The mobile station 300 may optionally be implemented with an examining or checking means 340, adapted for investigating and determining the format of a DRX parameter, i.e. check whether the parameter is of the core network associated parameter set or of the radio access network associated parameter set. If the checking means 340 detects a DRX parameter of the core network parameter set, it may forward the parameter to the mapping means 310 for mapping to a corresponding SPLIT_PG_CYCLE value, which then may be stored in the memory 320 or used to determine a paging period. If the mobile station 300 in advance knows, e.g. due to specified in standard, to which parameter set the different DRX parameters from GERAN and the core network domains belong, no parameter checking is required and the checking means 340 may be omitted.

A comparison means 350 is preferably implemented in the mobile station 300 for comparing (stored) DRX parameters relevant for the operational mode of the mobile station 300, for example comparing the CS and PS DRX parameters, when the mobile station 300 is operating in RRC idle mode attached to both the CS and PS core network domain. The input parameters to the comparison means 350 may be provided from the memory 320, through a negotiation procedure, e.g. from the negotiation means 330, or received from the radio access network or core network using a receiver, schematically illustrated by 380 in FIG. 6. Based on the comparison, selecting means 355, implemented in connection to the comparison means 350, selects the DRX parameter that results in the shortest paging period for the mobile station 300, i.e. selects max[SPLIT_PG_CYCLE].

In order to determine its paging period, the mobile station 300 is provided with a paging period determining means 360, which uses an input DRX parameter from e.g. the selecting means 355, memory 320 or receiver 380 for its calculations. The result from the period determining means 360 is used by the mobile station 300 to schedule the time instances of reception of any paging messages. Knowledge of this paging period, allows the mobile station 300 to power down during the periods between paging instances and thereby save battery. In addition, it may schedule processing of different tasks during these non-paging periods, without any risk of interruption or delay of the task processes due to incoming paging calls.

The mobile station also comprises, or is cooperating with, an identity module 390, e.g. a network subscriber identity module, such as a GSM SIM, comprising the IMSI associated with a subscription to a network operator.

This identity module 390 may be provided with standardized default values of some or all of the DRX paging parameters discussed above. In particular, a default PS CN specific DRX cycle length coefficient (or its mapped default PS SPLIT_PG_CYCLE counterpart) may be stored in a memory 394 of the identity module 390 for usage if no PS DRX parameter is determined in the negotiation procedure with the PS core network domain.

The mobile station 300 is preferably also equipped with an attaching means 370 for attaching or including the relevant DRX parameter in messages to GERAN and/or the core network. For example, the mobile station 300 may include the PS CN specific DRX cycle length coefficient in GPRS attach request and/or routing area update messages sent to the 3G-SGSN of the PS core network domain. Then the attaching means 370 may be implemented to fetch the PS DRX parameter from the memory 320 or receive it from the negotiation means 330 or receiver 380. If the memory 320, instead stores the PS SPLIT_PG_CYCLE counterpart, PS SPLIT_PG_CYCLE may first be forwarded to the mapping means 310, which maps the parameter to the desired DRX parameter of the core network parameter set. Once, provided to the PS core network domain, the 3G-SGSN will eventually include this PS CN specific DRX cycle length coefficient in paging request messages transmitted to GERAN (which will map the parameter to PS SPLIT_PG_CYCLE for determining the paging period).

The mobile station 300 preferably also provides the PS core network domain with the "legacy GPRS DRX parameters". These parameters were discussed in the background section and include SPLIT on CCCH, non-DRX timer and the GPRS SPLIT_PG_CYCLE. These legacy parameters will no be used as long as the mobile station 300 stays within cells supporting GERAN Iu mode, but can be used if the mobile station 300 moves to a cell with only A/Gb mode support, i.e. a cell associated with a second generation GSM/GPRS core network, including a 2G-MSC and 2G-SGSN. If these legacy GPRS parameters are provided to the 3G-SGSN through the action of the attaching means 370, they will be sent to the 2G-SGSN upon cell change.

Figure 7:
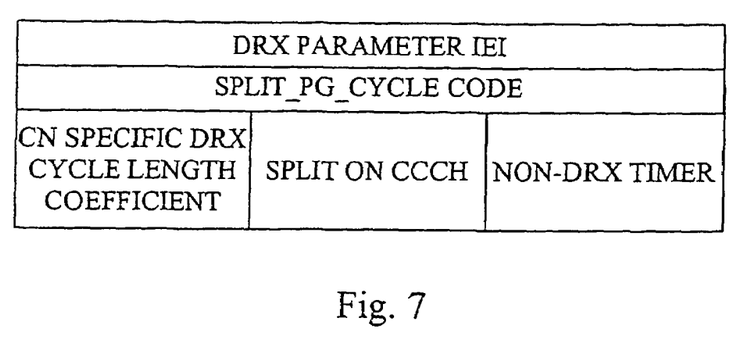
FIG. 7 is an illustration of a DRX parameter information element of the invention.

FIG. 7 illustrates a DRX parameter information element of the invention, which may be transmitted from the mobile station informing the network of its DRX parameters. The information element may include the SPLIT_PG_CYCLE code, which is binary coded and is used to derive the SPLIT_PG_CYCLE value. CN specific DRX cycle length coefficient contains the value of the PS DRX parameter or states if this parameter is not specified by the mobile station, i.e. negotiated, in which case a default value should be used. Furthermore, SPLIT on CCCH indicates whether SPLIT_PG_CYCLE is supported on CCCH by the mobile station and non-DRX timer specifies the time length of non-DRX mode after transition from RR packet transfer mode or RR dual transfer mode to RR packet idle mode.

Returning to FIG. 6, the attaching means 370 may also include the PS DRX cycle length coefficient in routing area update message when the mobile station 300 moves from a cell supporting only A/Gb mode to a UTRAN cell. Similarly the DRX cycle length coefficient may be attached to routing area update messages when moving from an A/Gb supporting cell to a cell supporting a GERAN Iu mode. This is because a later movement to a UTRAN cell from the GERAN Iu mode operating cell will not necessarily result in a change of routing area, and consequently no routing area update message is transmitted by the mobile station 300. However, if the mobile station 300 moves from a UTRAN cell to a cell supporting GERAN Iu mode, no new transfer of DRX parameters over the radio interface is required. The 3G-SGSN will use the PS CN specific DRX cycle length coefficient and GERAN and/or the mobile station 300 will map it to a PS SPLIT_PG_CYCLE value.

The above identified means 310, 330–370 may be provided as hardware, implemented as software or provided as a combination thereof. If they are provided as software implementations, they may be downloaded for implementation on the identity module 390. As the identity module—mobile station interface typically is associated with commands intended to send more or less arbitrary data to the identity module 390 for use therein, e.g. the "ENVELOPE" command for GSM SIM cards, the code for implementing the means 310, 330–370, e.g. as a general Java Applet application, could be sent using such commands. In such a case, the means 310, 330–370 may be implemented in an application environment 392 provided by an application toolkit associated with the identity module 390, e.g. SAT (SIM Application Toolkit). A distributed implementation is also possible with some means implemented in the mobile station 300 and some in the identity module 390. However, the above-identified means 310, 330–370 is preferably implemented where the RRC layer is provided in the mobile station 300.

Figure 8:
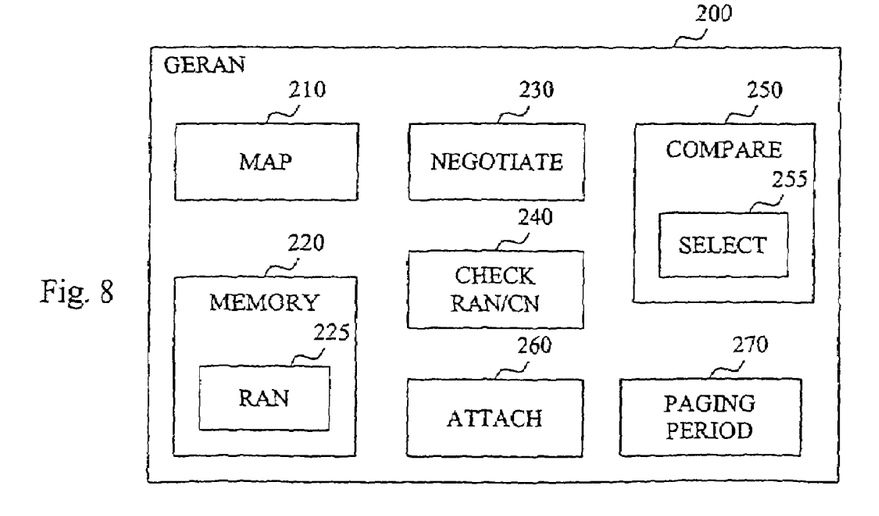
FIG. 8 is a schematic block diagram illustrating a radio access network adapted for employing the present invention.

A corresponding block diagram of a radio access network, e.g. GERAN, according to the invention is illustrated in FIG. 8. The radio access network 200 preferably comprises a mapping means 210, which is adapted for mapping CN specific DRX cycle length parameters to corresponding SPLIT_PG_CYCLE values. The operation of this mapping means 210 is similar to the mapping means 310 of FIG. 6, and reference is made to the discussion above. Furthermore, a memory 220 may be arranged to store the DRX parameter of the core network domain(s), to which the mobile station is attached. However, if these parameters are provided, either from the core network itself, e.g. in paging request messages or broadcast on PBCCH, the memory 220 may be omitted. The radio access network 200 may also comprise a memory 225 for storing its associated GERAN SPLIT_PG_CYCLE. A negotiation means 230 may be implemented to negotiate the value of GERAN SPLIT_PG_CYCLE with the mobile station. GERAN 200 may also include an examining or checking means 240 for investigating to which parameter set provided DRX parameters belong, if not set in standard. A comparison means 250 may be configured to compare any broadcast DRX parameter associated with the domain(s), to which the mobile station is attached, with any DRX parameter included in paging request messages received from the core network. In addition, if the mobile station is operating in RRC connected mode, the GERAN SPLIT_PG_CYCLE should be included in the comparison. A selecting means 255 selects the DRX parameter, of those compared by the comparing means 250, resulting in the shortest paging period, i.e. max[SPLIT_PG_CYCLE], or resulting in the longest paging period, i.e. min [SPLIT_PG_CYCLE], depending on which embodiment of the invention that is employed. However, if the radio access network 200 is configured to always use the DRX paramter included in paging request messages received from the core network, the comparison 250 and selecting 255 means may be omitted.

The radio access network 200 preferably comprises an attaching means for attaching the GERAN SPLIT_PG_CYCLE provided from the memory 225 to messages transmitted to the mobile station. Typical messages, to which the GERAN DRX parameter may be attached, include cell update confirm, GRA update confirm, radio bearer reconfiguration, radio bearer release, radio bearer setup and RRC connection setup messages. The radio access network 270 also comprises a paging period determining means 270 for determining the present paging period of the mobile station. The paging period may be determined based on the DRX parameter selected by selecting means 255 or received in paging request messages.

The above identifies means 210, 230–270 of the radio access network 200 may be provided as hardware, software or a combination of hardware and software in a BSS, BSC and/or BTS of the radio access network 200. The means 210, 230–270 may be implemented together or distributed, e.g. some may be implemented in the BSC with others in one or several BTS, controlled by the BSC. However, at least the mapping means 210 is preferably implemented in a logical unit scheduling paging occasions, e.g. on PCCCH, for GERAN. Such a unit may be provided in a PCU (Packet Control Unit), controlling packet data.

In the description above, the mapping according to the invention has primarily been discussed as mapping a DRX parameter of the core network associated parameter set (DRX cycle length coefficient) to a DRX parameter of the radio access network associated parameter set (SPLIT_PG_CYCLE), however, the opposite procedure may also be employed, i.e. mapping SPLIT_PG_CYCLE to a DRX cycle length coefficient. In such a case, the comparison of DRX parameters for selecting the DRX parameter used to calculate the paging period used by the mobile station may be based on DRX parameters of the core network parameter set. Then the selection of the DRX parameter resulting in the shortest paging period should then be min[DRX cycle length coefficient] and correspondingly max [DRX cycle length coefficient] results in the longest paging period.

It will be understood a person skilled in the art that various modifications and changes may be made to the present invention without departure from the scope thereof, which is defined by the appended claims.

REFERENCES

1 "Digital cellular telecommunications system (Phase 2+); Discontinuous Reception (DRX) in the GSM system", 3GGP TS 43.013 version 5.0.0

2 "Digital cellular telecommunications system (Phase 2+); Universal Mobile Telecommunications System (UMTS); Mobile radio interface Layer 3 specification; Core network protocols; Stage 3", 3GGP TS 24.008 version 5.5.0

3 "Digital cellular telecommunications system (Phase 2+); Mobile radio interface layer 3 specification; Radio Resource Control Protocol"; 3GGP TS 44.018 version 5.6.0

4 "Digital cellular telecommunications system (Phase 2+); General Packet Radio Service (GPRS); Mobile Station (MS)—Base Station System (BSS) interface; Radio Link Control/Medium Access Control (RLC/MAC) protocol), 3GPP TS 44.060 version 5.3.0

5 "Universal Mobile Telecommunications System (UMTS); UE Procedures in Idle Mode and Procedures for Cell Reselection in Connected Mode", 3GPP TS 25.304 version 5.1.0

6 "Universal Mobile Telecommunications System (UMTS); RRC Protocol Specification", 3GGP TS 25.331 version 4.0.0

7 "Universal Mobile Telecommunications System (UMTS); UTRAN Iu interface RANAP signaling", 3GGP TS 25.413 version 5.1.0

8 Müller F., et al, "Further evolution of the GSM/EDGE radio access network" *Ericsson Review no. 3* (2001)

The invention claimed is:

1. A method of determining a paging period between possible paging occasions for a mobile station in a cellular communication system comprising a core network (CN) and a radio access network (RAN), said method comprising the steps of:
   providing a paging parameter of a CN associated parameter set;
   mapping said paging parameter of said CN associated parameter set to a paging parameter of a RAN associated parameter set; and
   determining said paging period based on said paging parameter of said RAN associated parameter set.

2. The method according to claim 1, wherein a time length of said paging period is similar to a time length of a paging period determined by said paging parameter of said CN associated parameter set.

3. The method according to claim 1, wherein said mapping is performed according to:
   paging parameter of said RAN parameter set=$3 \times 2^{(9-\text{paging parameter of said CN parameter set})}$.

4. The method according to claim 1, wherein a paging period determined by a paging parameter of said RAN associated parameter set is an integer multiple of a shorter paging period determined by a larger paging parameter of said RAN associated parameter set.

5. The method according to claim 1, wherein said core network comprises a circuit-switched (CS) core network domain and a packet-switched (PS) core network domain, said CS core network domain is associated with a CS paging parameter of said RAN associated parameter set and said PS core network domain is associated with a PS paging parameter of said CN associated parameter set, said method comprises the further step of:
   said radio access network broadcasting said CS paging parameter of said RAN associated parameter set.

6. The method according to claim 1, wherein said core network comprises a circuit-switched (CS) core network domain and a packet-switched (PS) core network domain, said CS core network domain is associated with a CS paging parameter of said CN associated parameter set and said PS core network domain is associated with a PS paging parameter of said CN associated parameter set, said method comprises the further steps of:
   said radio access network mapping said CS paging parameter of said CN associated parameter set to a CS paging parameter of said RAN associated parameter set; and
   said radio access network broadcasting said CS paging parameter of said RAN associated parameter set.

7. The method according to claim 5, wherein said mobile station and said PS core network domain negotiating said PS paging parameter of said CN parameter set.

8. The method according to claim 5, wherein method further comprises the steps of:
   said radio access network mapping said PS paging parameter of said CN associated parameter set to a PS paging parameter of said RAN associated parameter set; and
   said radio access network broadcasting said PS paging parameter of said RAN associated parameter set.

9. The method according to claim 5, wherein said PS paging parameter of said CN associated parameter set is specified in standard.

10. The method according to claim 5, wherein said PS paging parameter of said CN associated parameter set is stored in an identity module associated with said mobile station.

11. The method according to claim 5, wherein said method comprises the further step of:
    a mobile station in idle mode attached to said CS core network domain determining said paging period based on said CS paging parameter of said RAN associated parameter set.

12. The method according to claim 5, wherein said method comprises the further steps of:
    a mobile station in idle mode attached to said PS core network domain mapping said PS paging parameter of said CN associated parameter set to a PS paging parameter of said RAN parameter set; and
    said mobile station determining said paging period based on said PS paging parameter of said RAN associated parameter set.

13. The method according to claim 5, wherein said method comprises the further steps of:
    a mobile station in idle mode attached to said CS core network domain and said PS core network domain mapping said PS paging parameter of said CN associated parameter set to a PS paging parameter of said RAN parameter set;
    said mobile station comparing said CS and PS paging parameter of said RAN associated parameter set; and
    said mobile station determining said paging period based on the largest of said compared CS and PS paging parameter of said RAN associated parameter set.

14. The method according to claim 5, wherein said radio access network broadcasting a RAN paging parameter of said RAN associated parameter set.

15. The method according to claim 5, wherein said radio access network including a RAN paging parameter of said RAN associated parameter set in a cell update confirm, a GRA (GERAN Registration Area) update confirm, a radio bearer reconfiguration, a radio bearer release, a radio bearer setup and/or a RRC (Radio Resource Control) connection setup message to said mobile station.

16. The method according to claim 5, wherein said mobile station and said radio access network negotiating a RAN paging parameter of said RAN associated parameter set.

17. The method according to claim 14, wherein said method comprises the further steps of:
    a mobile station in connected mode attached to said CS core network domain comparing said RAN and CS paging parameter of said RAN associated parameter set; and
    said mobile station determining said paging period based on the largest of said compared RAN and CS paging parameter of said RAN associated parameter set.

18. The method according to claim 14, wherein said method comprises the further steps of:
    a mobile station in connected mode attached to said PS core network domain mapping said PS paging parameter of said CN associated parameter set to a PS paging parameter of said RAN associated parameter set;
    said mobile station comparing said RAN and PS paging parameter of said RAN associated parameter set; and
    said mobile station determining said paging period based on the largest of said compared RAN and PS paging parameter of said RAN associated parameter set.

19. The method according to claim 14, wherein said method comprises the further steps of:
    a mobile station in connected mode attached to said CS core network domain and said PS core network domain mapping said PS paging parameter of said CN associated parameter set to a PS paging parameter of said RAN parameter set;

said mobile station comparing said RAN, CS and PS paging parameter of said RAN associated parameter set; and said mobile station determining said paging period based on the largest of said compared CS, RAN and PS paging parameter of said RAN associated parameter set.

20. The method according to claim 1, wherein said PS paging parameter of said CN associated parameter set is included by said mobile station in a GPRS attach request message and/or a routing area update message to said core network.

21. A cellular communication system for determining a paging period between possible paging occasions for a mobile station, said system comprising a radio access network (RAN) and a core network (CN), which core network comprises means for providing a paging parameter of a CN associated parameter set, wherein said system comprises:

means for mapping said paging parameter of said CN associated parameter set to a paging parameter of a RAN associated parameter set; and means for determining said paging period based on said paging parameter of said RAN associated parameter set.

22. The system according to claim 21, wherein a time length of said paging period is similar to a time length of a paging period determined by said paging parameter of said CN associated parameter set.

23. The system according to claim 21, wherein said mapping means is configured to calculate said paging parameter of said RAN associated parameter set according to:

paging parameter of said RAN parameter set=$3 \times 2^{(9-paging\ parameter\ of\ said\ CN\ parameter\ set)}$.

24. The system according to claim 21, wherein a paging period determined by a paging parameter of said RAN associated parameter set is an integer multiple of a shorter paging period determined by a larger paging parameter of said RAN associated parameter set.

25. The system according to claim 21, wherein said core network comprises a circuit-switched (CS) core network domain and a packet-switched (PS) core network domain, said CS core network domain is associated with a CS paging parameter of said RAN associated parameter set and said PS core network domain is associated with a PS paging parameter of said CN associated parameter set, whereby said radio access network comprises means for broadcasting said CS paging parameter of said RAN associated parameter set.

26. The system according to claim 21, wherein said core network comprises a circuit-switched (CS) core network domain and a packet-switched (PS) core network domain, said CS core network domain is associated with a CS paging parameter of said CN associated parameter set and said PS core network domain is associated with a PS paging parameter of said CN associated parameter set, whereby said mapping means is configured for mapping said CS paging parameter of said CN associated parameter set to a CS paging parameter of said RAN associated parameter set and said radio access network comprises means for broadcasting said CS paging parameter of said RAN associated parameter set.

27. The system according to claim 25, wherein said determining means is implemented in a mobile station in idle mode attached to said CS core network domain for determining said paging period based on said CS paging parameter of said RAN associated parameter set.

28. The system according to claim 25, wherein said mapping means is provided in a mobile station in idle mode attached to said PS core network domain and is adapted for mapping said PS paging parameter of said CN associated parameter set to a PS paging parameter of said RAN parameter set and said determining means is implemented in said mobile station for determining said paging period based on said PS paging parameter of said RAN associated parameter set.

29. The system according to claim 25, wherein said mapping means is provided in a mobile station in idle mode attached to said CS core network domain and said PS core network domain and is adapted for mapping said PS paging parameter of said CN associated parameter set to a PS paging parameter of said RAN parameter set, and said mobile station comprises means for comparing said CS and PS paging parameter, whereby said determining means is implemented in said mobile station for determining said paging period based on the largest of said compared CS and PS paging parameter of said RAN associated parameter set.

30. The system according to claim 25, wherein said radio access network is associated with a radio RAN parameter of said RAN associated parameter set.

31. The system according to any of the claims 30, wherein a mobile station in connected mode attached to said CS core network domain comprises means for comparing said RAN and CS paging parameter of said RAN associated parameter set, whereby said determining means is implemented in said mobile station for determining said paging parameter based on the largest of said compared RAN and CS paging parameter of said RAN associated parameter set.

32. The system according to claim 30, wherein said mapping means is provided in a mobile station in connected mode attached to said PS core network domain and is adapted for mapping said PS paging parameter of said CN associated parameter set to a PS paging parameter of said RAN parameter set, and said mobile station comprises means for comparing said RAN and PS paging parameter of said RAN associated parameter set, whereby said determining means is implemented in said mobile station for determining said paging period based on the largest of said RAN and PS paging parameter of said RAN associated parameter set.

33. The system according to claim 30, wherein said mapping means is provided in a mobile station in connected mode attached to said CS core network domain and said PS core network domain and is adapted for mapping said PS paging parameter of said CN associated parameter set to a PS paging parameter of said RAN parameter set, and said mobile station comprises means for comparing said RAN, CS and PS paging parameter of said RAN associated parameter set, whereby said determining means is implemented in said mobile station for determining said paging period based on the largest of said CS, RAN and PS paging parameter of said RAN associated parameter set.

34. The system according to claim 21, wherein said core network is a UMTS (Universal Mobile Telecommunications System) core network and said radio access network is a GERAN (Global system for mobile communication Enhanced data rates for global evolution Radio Access Network) radio access network operating in Iu mode.

35. A radio access network (RAN) for determining a paging period between possible paging occasions for a mobile station in cellular communication system comprising said radio access network and a core network (CN), which core network comprises means for providing a paging parameter of a CN associated parameter set, wherein said radio access network comprises:

means for mapping said paging parameter of said CN associated parameter set to a paging parameter of a RAN associated parameter set; and means for determining said paging period based on said paging parameter of said RAN associated parameter set.

36. The network according to claim 35, wherein a time length of said paging period is similar to a time length of a paging period determined by said paging parameter of said CN associated parameter set.

37. The network according to claim 35, wherein said mapping means is configured to calculate said paging parameter of said RAN associated parameter set according to:

paging parameter of said RAN parameter set=$3 \times 2^{(9-paging\ parameter\ of\ said\ CN\ parameter\ set)}$.

38. The network according to claim 35, wherein a paging period determined by a paging parameter of said RAN associated parameter set is an integer multiple of a shorter paging period determined by a larger paging parameter of said RAN associated parameter set.

39. The network according to claim 35, wherein said core network comprises a circuit-switched (CS) core network domain and a packet-switched switched (PS) core network domain, said CS core network domain is associated with a CS paging parameter of said RAN associated parameter set and said PS core network domain is associated with a PS paging parameter of said CN associated parameter set, whereby said radio access network comprises means for broadcasting said CS paging parameter of said RAN associated parameter set.

40. The network according to claim 35, wherein said core network comprises a circuit-switched (CS) core network domain and a packet-switched (PS) core network domain, said CS core network domain is associated with a CS paging parameter of said CN associated parameter set and said PS core network domain is associated with a PS paging parameter of said CN associated parameter set, whereby said mapping means is configured for mapping said CS paging parameter of said CN associated parameter set to a CS paging parameter of said RAN associated parameter set and said radio access network comprises means for broadcasting said CS paging parameter of said RAN associated parameter set.

41. The network according to claim 39, wherein said mapping means is configured to map said PS paging parameter of said CN associated parameter set to a PS paging parameter of said RAN associated parameter set and said radio access network comprises means for broadcasting said PS paging parameter of said RAN associated parameter set.

42. The network according to claim 39, wherein said radio access network comprises means for receiving a paging parameter transmitted in a paging request from a core network domain to which said mobile station is attached, whereby said mapping means is configured to map a received paging parameter of said CN associated parameter set to a corresponding paging parameter of said RAN associated parameter set.

43. The network according to claim 42, wherein said radio access network comprises means for comparing said paging parameter of said RAN associated parameter set associated with a core network domain to which a mobile station in idle mode is attached and said paging parameter of said RAN associated parameter set associated with said paging request message, whereby said determining means is implemented for determining said paging period based on the largest of said compared paging parameters of said RAN associated parameter set.

44. The network according to claim 42, wherein said radio access network comprises means for comparing said paging parameter of said RAN associated parameter set associated with a core network domain to which a mobile station in idle mode is attached and said paging parameter of said RAN associated parameter set associated with said paging request message, whereby said determining means is implemented for determining said paging period based on the smallest of said compared paging parameters of said RAN associated parameter set.

45. The network according to claim 42, wherein said radio access network comprises means for broadcasting a radio RAN parameter of said RAN associated parameter set.

46. The network according to claim 42, wherein said radio access network comprises means for including a RAN paging parameter of said RAN associated parameter set in a cell update confirm, a GRA (GERAN Registration Area) update confirm, a radio bearer reconfiguration, a radio bearer release, a radio bearer setup and/or a RRC connection setup message to said mobile station.

47. The network according to claim 42, wherein said radio access network comprises means for negotiating a RAN paging parameter of said RAN associated parameter set with said mobile station.

48. The network according to claim 45, wherein said radio access network comprises means for comparing said paging parameter of said RAN associated parameter set associated with a core network domain to which a mobile station in idle mode is attached, said paging parameter of said RAN associated parameter set associated with said paging request message and said RAN paging parameter of said RAN associated parameter set, whereby said determining means is implemented for determining said paging period based on the largest of said compared paging parameters of said RAN associated parameter set.

49. The network according to claim 45, wherein said radio access network comprises means for comparing said paging parameter of said RAN associated parameter set associated with a core network domain to which a mobile station in idle mode is attached, said paging parameter of said RAN associated parameter set associated with said paging request message and said RAN paging parameter of said RAN associated parameter set, whereby said determining means is implemented for determining said paging period based on the smallest of said compared paging parameters of said RAN associated parameter set.

50. A mobile station for determining a paging period between possible paging occasions in a cellular communication system comprising a radio access network (RAN) and a core network (CN), which core network comprises means for providing a paging parameter of a CN associated parameter set, wherein said mobile station comprises:

means for mapping said paging parameter of said CN associated parameter set to a paging parameter of a RAN associated parameter set; and means for determining said paging period based on said paging parameter of said RAN associated parameter set.

51. The mobile station according to claim 50, wherein a time length of said paging period is similar to a time length of a paging period determined by said paging parameter of said CN associated parameter set.

52. The mobile station according to claim 50, wherein said mapping means is configured to calculate said paging parameter of said RAN associated parameter set according to:

paging parameter of said RAN parameter set=$3\times2^{(9-paging\ parameter\ of\ said\ CN\ parameter\ set)}$.

53. The mobile station according to claim 50, wherein a paging period determined by a paging parameter of said RAN associated parameter set is an integer multiple of a shorter paging period determined by a larger paging parameter of said RAN associated parameter set.

54. The mobile station according to claim 50, wherein said core network comprises a circuit-switched (CS) core network domain and a packet-switched (PS) core network domain, said CS core network domain is associated with a CS paging parameter and said PS core network domain is associated with a PS paging parameter of said CN associated parameter set, whereby said mobile station comprises means for receiving a CS paging parameter of said RAN associated parameter set broadcast from said radio access network.

55. The mobile station according to claim 54, wherein said mobile station comprises means for negotiating said PS paging parameter of said CN associated parameter set with said PS core network domain and said mapping means is configured to map said PS paging parameter of said CN associated parameter set to a PS paging parameter of said RAN associated parameter set.

56. The mobile station according to claim 54, wherein said PS paging parameter of said CN associated parameter set is stored in an identity module associated with said mobile station and said mapping means is configured to map said PS paging parameter of said CN associated parameter set to a PS paging parameter of said RAN associated parameter set.

57. The mobile station according to claim 54, wherein said PS paging parameter of said CN associated parameter set is specified in standard and said mapping means is configured to map said PS paging parameter of said CN associated parameter set to a PS paging parameter of said RAN associated parameter set.

58. The mobile station according to claim 55, wherein said mobile station is in idle mode and comprises means for selecting the largest of said paging parameters of said RAN associated parameter set associated with a core network domain to which said mobile station is attached, whereby said determining means is implemented for determining said paging period based on said largest paging parameter of said RAN associated parameter set.

59. The mobile station according to claims 55, wherein said mobile station comprises means for negotiating a RAN paging parameter of said RAN associated parameter set with said radio access network.

60. The mobile station according to claim 59, wherein said mobile station is in connected mode and comprises means for selecting the largest of said paging parameters of said RAN associated parameter set associated with a core network domain to which said mobile station is attached and said RAN paging parameter of said RAN associated parameter set, whereby said determining means is implemented for determining said paging period based on said selected largest paging parameter of said RAN associated parameter set.

61. The mobile station according to claim 50, wherein said mobile station comprises means for including said paging parameter of said CN associated parameter set in a GPRS Attach Request message and/or a Routing Area Update message to said core network.

* * * * *